Feb. 6, 1951  A. B. LOWE ET AL  2,540,791
BEET LOADER TRACTOR TRAILER
Filed July 13, 1946
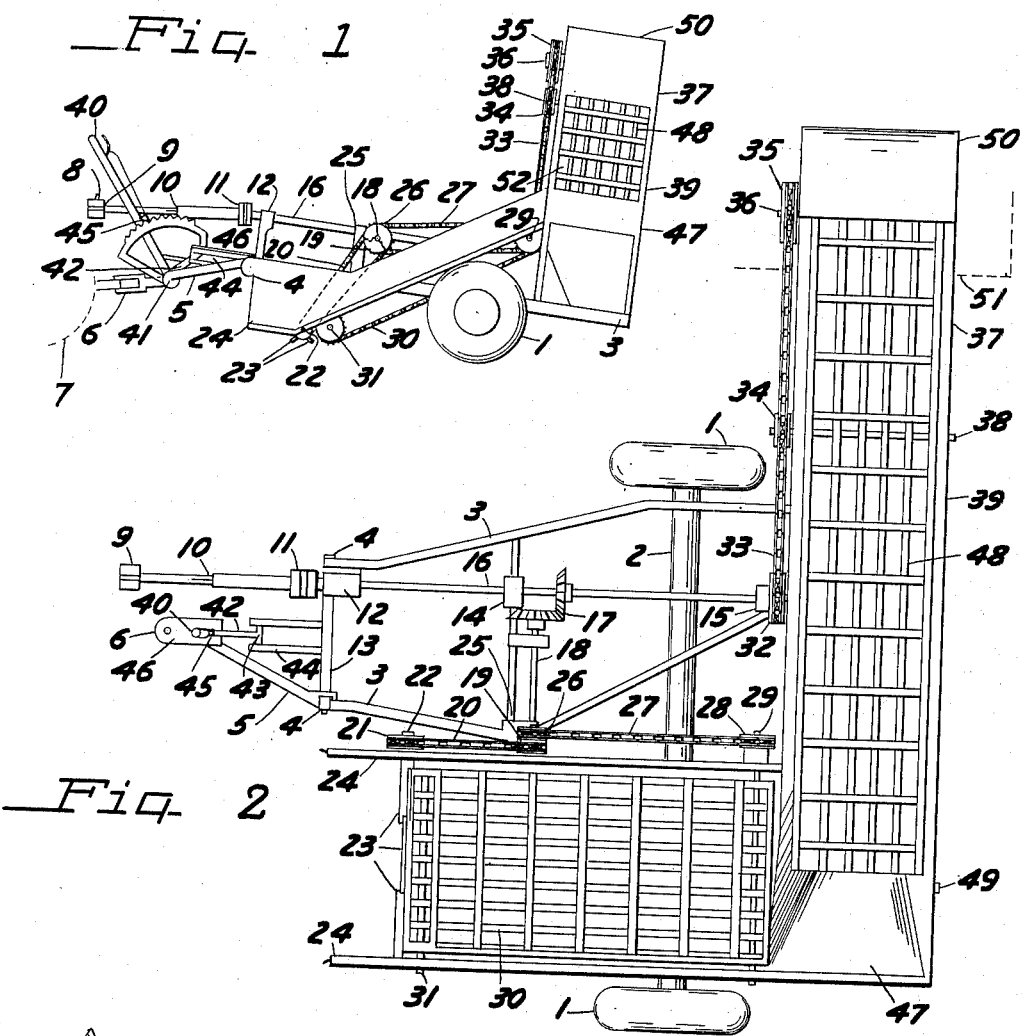
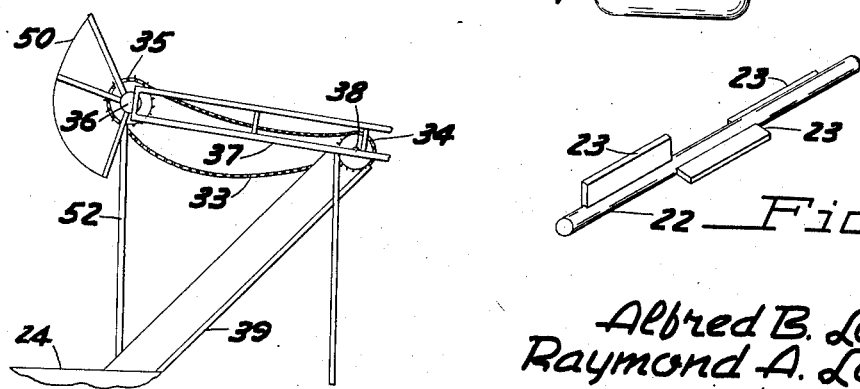
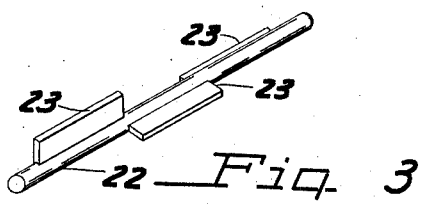
Inventors
Alfred B. Lowe
Raymond A. Lowe
By
Geo E Kirk
Attorney Patented Feb. 6, 1951

2,540,791

UNITED STATES PATENT OFFICE 2,540,791

BEET LOADER TRACTOR TRAILER

Alfred B. Lowe and Raymond A. Lowe,
Ottawa County, Ohio

Application July 13, 1946, Serial No. 683,366

2 Claims. (Cl. 198—9)

This invention relates to assembling and elevating articles for delivery into a receiver.

This invention has utility when incorporated in a trailer unit from a tractor, with power-take-off thereto from the tractor. A collector-kicker device has a travel course afield, say along a row of topped and lifted sugar beets. These uprooted beets lie upon the top of, or very close to the top of, the ground. The kicker-device pummels the loose beets over to a first stage elevator having a slight ascent endless openwork belt, to allow dirt and non-beet fragments to sift thru. A second major length elevator, also of screening or openwork type, takes the beets from an intermediate hopper and beyond the extension joint portion of this second elevator for delivery into a truck or other receptacle adapted to move along therewith.

Referring to the drawings:

Fig. 1 is a side elevation of an embodiment of the invention in a beet pick-up and loader;

Fig. 2 is a plan view of the loader of Fig. 1, on a slightly larger scale;

Fig. 3 is a perspective view of the collector-kicker device, as an enlarged detail from the showing in Fig. 3; and Fig. 4 is a partial side elevation from the right of Fig. 1 showing features of the major elevator extension as folded back, in reducing to more compact form for interfield transit.

Ground wheels 1 have an axle 2 therebetween. Rockable thereon as an axle or fulcrum is a forwardly extending frame section 3 having bearings 4 for frame extension 5, converging to a clevis device 6 adapted as a trailer hitch to a tractor 7. A rearwardly directed power take-off 8 from the tractor 7 has connection 9 to a telescopic shaft section 10 having a knuckle or universal joint 11 adjacent a bearing 12 fixed with a cross portion 13 of the frame 3 between the bearings 4.

Power transmission

Fixed with the frame 3 by bearings 12, 14, 15, is a shaft 16 from the universal joint 11. At the bearing 14 there is a bevel gear assembly 17 to a shaft 18 terminally having a sprocket wheel 19. Forwardly and downwardly therefrom is a sprocket chain 20 to a driven sprocket wheel 21 outboard on a shaft 22 having kicker leaves or sections 23 thereon between the sides of a frame 24 mounting the shaft 22.

Adjacent a bearing 25 for the shaft 18 to be fixed with the frame 3, there is an additional sprocket wheel 26 adjacent the sprocket wheel 19. From this sprocket wheel 26 there extends rearwardly a sprocket chain 27 above and back of the axle 2 to a sprocket wheel 28 on a shaft 29 as the drive shaft for an endless belt conveyor 30, as an openwork apron first stage elevator in the frame 24 from a cross shaft 31 adjacent the kicker 23, 24.

Outboard from the bearing 15, a sprocket wheel 32 is fixed on the shaft 16 and has upwardly extending therefrom a sprocket chain 33 as an endless belt, about a guide or intermediate pulley 34 to a sprocket gear wheel 35 on a shaft 36 in elevator frame terminal section 37 hinged on a shaft 38 carrying the pulley 34. The shaft 38 is in the upper end of a frame section 39 mounting the extension frame section 37.

Tilt adjustment

The hinged frame extension 5 has upstanding therefrom a handlever 40 having pivot connection 41 with the extension 5 parallel to and spaced forwardly from the common axis of the bearings 4. Upwardly and rearwardly from the pivot 41 and rigid with the lever 40 is an arm 42 having a crosspiece end 43 slidably in a guide 44 rigid with the frame 3. Accordingly, in pulling the lever 40 upper portion forwardly to have it so held thru its pawl 45 engaging in the quadrant 46, an upward tilt is given to the frame 3 on the axle 2, thereby to clear the forward portion of the frame 24 from the ground and shift the kicker 23 and the lower portion of the elevator apron 30 away from pick-up position.

Pick-up operation

Afield, sugar beets as topped and lifted, may be in rows atop the ground, to some extent commingled with soil, leaves, and weeds. The tractor 7 may be directed alongside such row, with the beet pick-up loader trailer of this invention attached thereto. For the pick-up operation, the hand lever 40 is thrown upright, or slightly inclined rearwardly, in order to have the frame sides 24 enter slightly into the loose top soil. The kicker 22, 23, as driven at high speed, and counterclockwise (Fig. 1), tends to ride say down as much as a couple of inches into the loose soil. This means that the wings 23 are shoved under the loose beets to throw the beets upward over the shaft 22 to lodge upon first elevator apron 30, as an openwork lift. The leaves, dirt and non-beet fragments tend to sift thru this endless belt, as the beets move upward thereon to be discharged into a chute 47 having as a movable bottom therefrom an elevator openwork apron 48 from a lower follower shaft 49 in the frame 39.

The upward reach of this second elevator apron is over the shaft 38 to be actuated from the shaft 36 fixed with the gear 35. The beets in this ascent, further to be freed from non-beet material, are thrown therefrom as confined by a hood 50 to lodge in a receptacle or truck 51.

*Non-pick-up transit*

When not for gathering beets, other crop or distributed articles, the take-off telescopic shaft section 10, which automatically allows for transmission at various adjustments, may be disconnected. The hand-lever 40 locked at a forward position by its pawl 45 engaging the quadrant 46, thus tilting the kicker 22, 23, shaft 31, and the forward portion of the frame 24 clear of the ground or roadway. Further, the extension frame 37 of the second elevator, may be swung on the shaft 38 as a pivot to be supported by a leg 52 (Fig. 4). The overall width of the trailer is thus brought into the range of its ground wheels 1.

The field operation hereunder for gathering sugar beets has worked out acceptably in having the transmission rotate the shaft 22 in the range of 200 R. P. M. With the shaft 22, 1½" in diameter, and the distance between the sides of the frame 24, 36", the leaves 23 have been found to have sufficient strength when ½" thick, and their pummeling or lifting power ample when radially extending from the outside of the shaft 22 as much as ¾".

The trailer equipment as hauled by a tractor, has the pick-up crop-approach region carrying the kicker device 22, 23, at one side of the course for the tractor 7, herein shown as at the left. The tractor thus need not traverse over the crop to be gathered. The practice in lifting field crops of the root type, such as beets, is to locate in sort of windrows on the loose soil. This does not mean that there is a smooth clean surface from which the beets may be shoveled up, but that there is usually a considerable portion of debris therewith, notwithstanding the beets may be topped. Accordingly, hereunder, it is the purpose to have the shaft 22 in its travel under side actually enter the loose top soil, thereby certainly to act below the crop to be garnered. This underside digging into the soil in the direction being pulled, liftingly agitates the beets in throwing the beets, with the loose dirt and other non-beet material, over the shaft 22 to land upon the down end of the conveyor belt in proximity to the shaft 22.

The setting of the hand lever 40 may determine the plow-like settling of the forward ends of the frame 24 for gouging action in locating the kicker 22, 23, properly. The more hard the soil, the less embedded the crop thereon, and accordingly the more superficial the pummeling and lifting of the crop to ascend upon the first stage elevator conveyor. With a slightly higher speed lineal travel rate for the second stage elevator conveyor, there is not accumulation in the hopper 47.

What is claimed and it is desired to secure by Letters Patent is:

1. A pick-up device for articles strewn afield in proximity to embedded grouping, said device comprising a portable elevator having a down-end article receiver, and in forward-feeder-lift continuity to the elevator up-kicker leaves, a rotary shaft mounting the leaves to extend straight longitudinally along the shaft in staggered end-to-end sequence, and a high speed drive for the shaft swinging embedded leaves from below the shaft forwardly of the shaft upward away from embedding position and out of the embedding to move over the shaft toward the elevator to fling articles from the embedded grouping to lodge upon the elevator.

2. Pick-up and truck loader equipment for field crop as distributed afield, said equipment comprising a two-wheeled trailer axle providing a fulcrum, a frame mounted on the axle fulcrum, a haulage connection for the frame including a link adapted to attach to a tractor for holding the equipment against angular shifting on the axle, said connection including a hand lever upstanding from and relatively to the link, said lever having connection therefrom to the frame to rock the frame on the axle relatively to the link attachment to the tractor, conveyor means carried by the frame and swingable therewith from the axle to have the ground clearance of the conveyor means varied by said shifting of the lever, and means for holding the lever in shifted position relatively to the link to fix the clearance from the ground of the conveyor means.

ALFRED B. LOWE.
RAYMOND A. LOWE.

REFERENCES CITED

The following references are of record in the file of this patent:

UNITED STATES PATENTS

| Number | Name | Date |
|---|---|---|
| 706,395 | De Jong | Aug. 5, 1902 |
| 985,991 | Fiebach | Mar. 7, 1911 |
| 1,258,142 | Pitcher | Mar. 5, 1918 |
| 1,431,857 | Willcox | Oct. 10, 1922 |
| 1,509,129 | Evans | Sept. 23, 1924 |
| 1,761,286 | Zuckerman | June 3, 1930 |
| 2,267,303 | Jordan | Dec. 23, 1941 |
| 2,421,999 | Dahlman | June 10, 1947 |
| 2,432,956 | Walz | Dec. 16, 1942 |
| 2,463,019 | Clausen | Mar. 1, 1949 |